June 19, 1951  H. E. ANTHONY  2,557,717
AIR FILTER
Filed Dec. 27, 1946
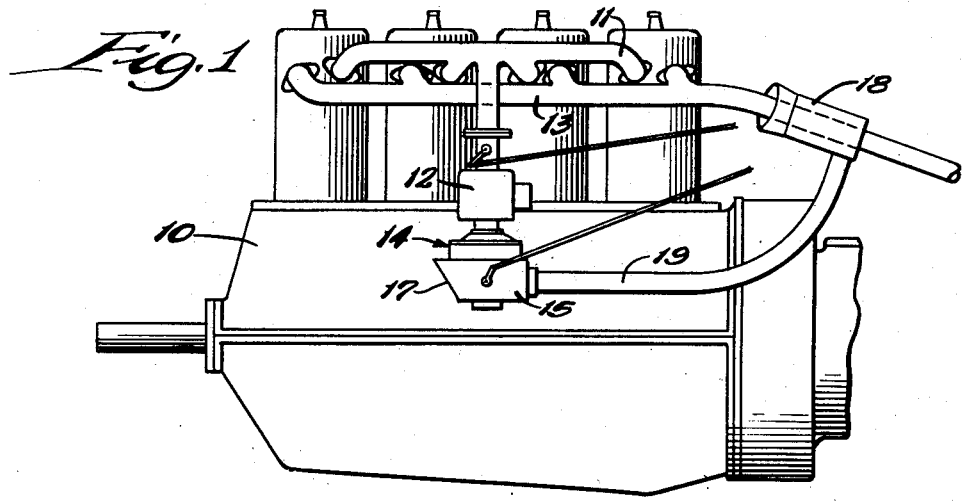
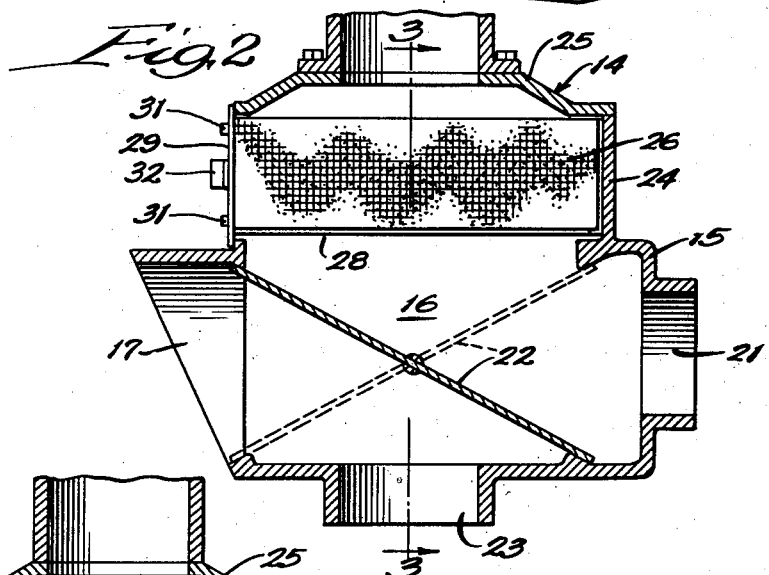
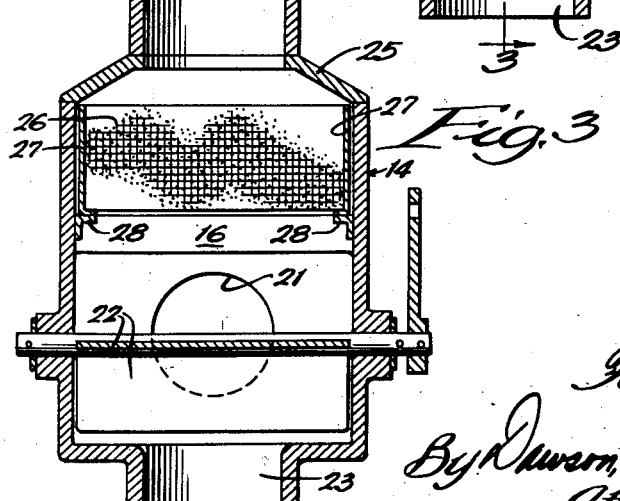
Inventor:
Howard E. Anthony,
By Dawson, Booth and Spangenberg,
Attorneys.

Patented June 19, 1951

2,557,717

UNITED STATES PATENT OFFICE 2,557,717

AIR FILTER

Howard E. Anthony, Benton Harbor, Mich.

Application December 27, 1946, Serial No. 718,709

2 Claims. (Cl. 183—67)

This invention relates to air filters and more particularly to filters for use with internal combustion engines on aircraft or the like to filter the air supplied to the carburetor.

Filters have heretofore been employed on aircraft engines which are connected to air scoops having a filter mass therein to supply cold air to the engine during normal operation and with a connection to a stove around the manifold to supply heated air to the engine. In these constructions the heated air is not filtered so that it sometimes carries dust particles into the engine and further it has been difficult to remove the filter unit from the air scoop for cleaning or replacement.

It is one of the objects of the present invention to provide an air filter in which all of the air either hot or cold entering the engine will be cleaned by a single filter unit.

Another object is to provide an air filter in which the filter unit can easily be removed and replaced for cleaning.

Still another object is to provide an air filter in which the filter unit is insertable into the casing and carries a closure plate for closing the opening in the casing through which the filter is inserted.

The above and other objects and advantages of the invention will be more readily apparent from the following description when read in connection with the accompanying drawing, in which—

Figure 1 is a diagrammatic elevation of an engine illustrating a mounting of a filter thereon;

Figure 2 is an enlarged section through a filter embodying the invention; and

Figure 3 is a transverse section on the line 3—3 of Figure 2.

As shown in Figure 1 the filter may be attached to any desired type of engine illustrated diagrammatically at 10 having an intake manifold 11 supplied with combustible mixture through a carburetor 12. An exhaust manifold 13 conducts exhaust gases from the engine.

Air is supplied to the carburetor for mixture with fuel therein through an air cleaner unit indicated generally at 14. As best seen in Figures 2 and 3, the air cleaner unit comprises a hollow body 15 having a lower air inlet chamber 16 therein. The forward end of the air inlet chamber is open throughout its full diameter to form an air scoop 17 which may be shaped to fit into the fuselage outline without projecting beyond the surface of the aircraft body. Cold air is received through the scoop and enters the carburetor for normal operation. To supply the carburetor with heated air for emergency operations such as take offs and landings when the engine is operated at less than full throttle, a stove 18 is provided around the exhaust manifold. The stove 18 scoops up air which is heated and supplied to the cleaner through a conduit 19 communicating with a heated air inlet 21 in the lower part of the cleaner body opposite to the air scoop.

Either cold or heated air may be supplied selectively to the engine under the control of a valve 22 pivoted in the air chamber. When the valve is in the position shown in full lines in Figure 2, the cold air entering the scoop will flow through a dump opening 23 in the bottom of the cleaner body and the heated air will be supplied to the engine. By turning the valve to the dotted line position, the cold air will be supplied to the engine and the heated air will flow through the dump opening.

Directly above the air inlet chamber the casing is formed with a rectangular section 24 having one side open and terminating at its top in a cover portion 25 formed for connection to the inlet of the carburetor and having an outlet opening therein to communicate with the carburetor air inlet. The rectangular portion 24 of the cleaner body provides a filter chamber to receive a filter unit indicated at 26. The unit 26 may be formed of any desired type of filter material such, for example, as a mass of woven wire and preferably carries side plates 27. The filter unit is of substantially the same size as the rectangular casing part and is adapted to be supported on elongated rails 28 in the casing so that all of the air passing from the inlet chamber 16 to the carburetor must flow through the filter to be cleaned thereby. In this way both the heated and cold air supplied to the engine are cleaned by the same filter unit.

In order that the filter unit may be removed for cleaning or replacement, it fits slidably in the casing on the rails 28 and carries at its forward end a closure plate 29 of a size to fit over the open side of the rectangular casing part. The plate may be secured to the casing by screws 31 or like fastenings so that when it is in place it will close the open side of the filter body to prevent entrance of air into the body except through the proper inlet openings. To remove the filter for cleaning, it is necessary only to take out the fastenings 31 so that the entire filter unit can be slid out like a drawer and can be cleaned. To facilitate handling of the filter, a handle 32 may be carried by the closure plate 29.

While one embodiment of the invention has been shown and described in detail herein, it will be understood that this is illustrative only and is not to be taken as a definition of the scope of the invention, reference being had for this purpose to the appended claims.

What is claimed is:

1. An air filter for use with an internal combustion engine comprising a hollow body, having a horizontally elongated inlet chamber formed at its ends with a cold air inlet and a heated air inlet, the body including a filter chamber above and communicating with the inlet chamber and having an outlet opening at its top remote from the inlet chamber, a valve in the inlet chamber selectively to connect either the cold or the heated air inlet to the filter chamber, the filter chamber having a lateral opening in one side thereof, and a filter removably insertable through the lateral opening and extending horizontally across the filter chamber to filter all of the air passing from the inlet chamber to the outlet.

2. An air filter for use with an internal combustion engine comprising a hollow body, having a horizontally elongated inlet chamber formed at its ends with a cold air inlet and a heated air inlet, the body including a filter chamber above and communicating with the inlet chamber and having an outlet opening at its top remote from the inlet chamber, a valve in the inlet chamber selectively to connect either the cold or the heated air inlet to the filter chamber, the filter chamber being rectangular in horizontal section and having a lateral opening in one side, a rectangular filter insertable through the lateral opening substantially to fill the filter chamber, and a closure plate carried by the filter to fit over and close the lateral opening.

HOWARD E. ANTHONY.

REFERENCES CITED

The following references are of record in the file of this patent:

UNITED STATES PATENTS

| Number | Name | Date |
| --- | --- | --- |
| 1,255,827 | Thurston | Feb. 5, 1918 |
| 1,363,331 | Livermore | Dec. 28, 1920 |
| 1,742,325 | Sweetland | Jan. 7, 1930 |
| 1,916,907 | Sargent | July 4, 1933 |
| 2,388,028 | Barber | Oct. 30, 1945 |
| 2,395,997 | Eckel | Mar. 5, 1946 |

FOREIGN PATENTS

| Number | Country | Date |
| --- | --- | --- |
| 55,650 | Sweden | May 18, 1920 |